(No Model.)
O. MERGENTHALER.
SHAFT BEARING.
No. 324,400. Patented Aug. 18, 1885.
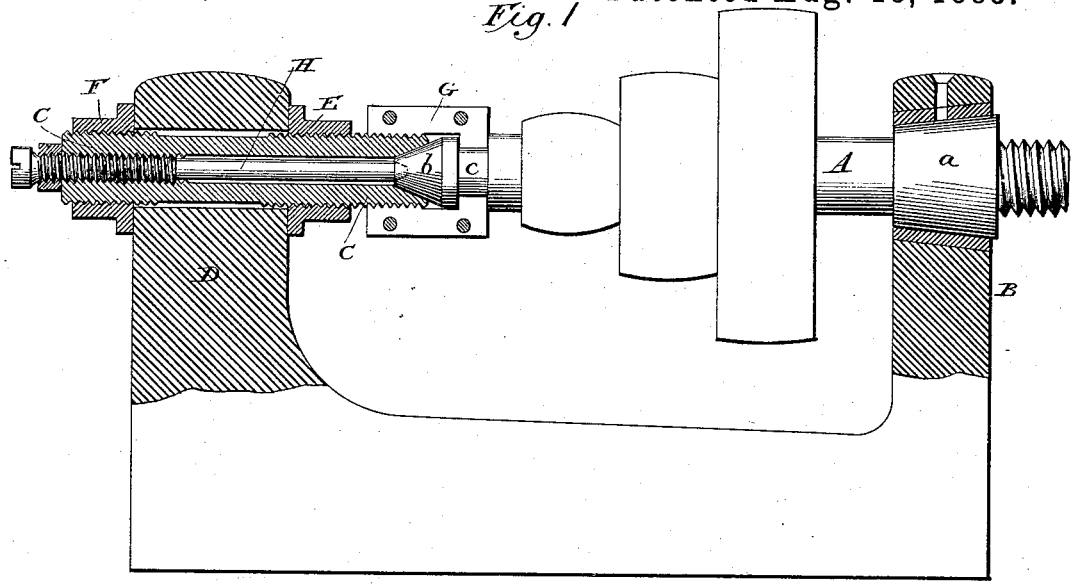
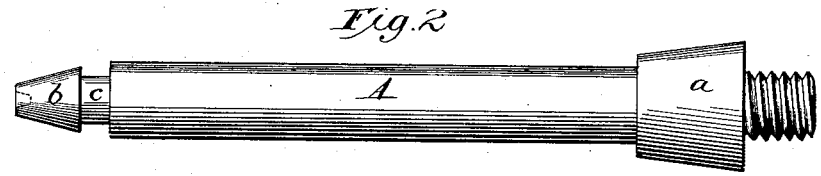
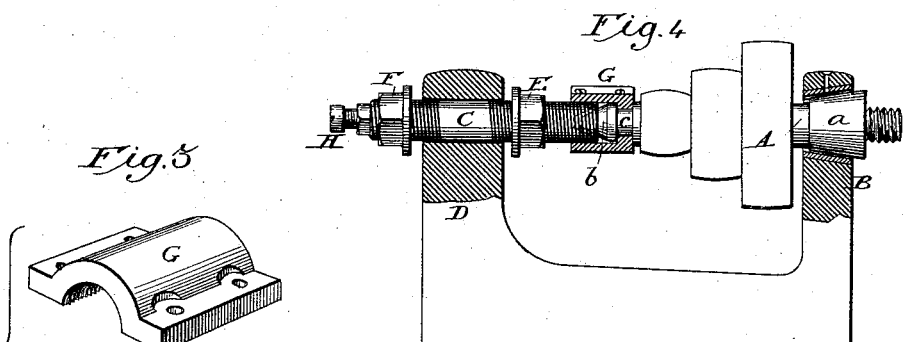
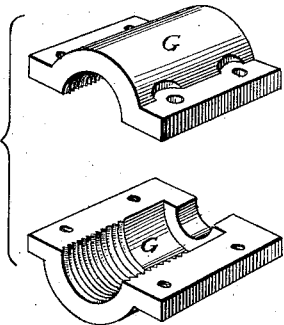
WITNESSES
Ottmar Mergenthaler
INVENTOR
By Philip T. Dodge
Attorney

UNITED STATES PATENT OFFICE.

OTTMAR MERGENTHALER, OF BALTIMORE, MARYLAND.

SHAFT-BEARING.

SPECIFICATION forming part of Letters Patent No. 324,400, dated August 18, 1885.

Application filed May 19, 1885. (No model.)

*To all whom it may concern:*

Be it known that I, OTTMAR MERGENTHALER, of Baltimore city, in the State of Maryland, have invented certain Improvements in Shafts and Shaft-Bearings, of which the following is a specification.

The aim of this invention is to provide a bearing which will admit of a spindle or shaft being driven at high speeds with safety, and in which increase of temperature resulting from undue friction or binding of the parts will cause the wearing-surfaces to be automatically relieved.

Referring to the accompanying drawings, Figure 1 represents a longitudinal vertical section through the head-stock of a lathe or similar machine provided with my improved bearing. Fig. 2 is a top plan view of the spindle or arbor. Fig. 3 is a perspective view of the two parts of the coupling or connection separated from each other and from the other parts. Fig. 4 is an outline view illustrating the manner of effecting the adjustment of the parts.

Referring to the drawings, A represents the shaft or spindle having its forward end provided with an enlarged conical bearing, $a$, and its rear end fashioned into a cone, $b$, and provided with a circumferential groove, $c$. It will be observed that the two conical bearing-surfaces are tapered in the same direction. The forward bearing, $a$, is seated in a stationary box or support, B, while the rear conical end, $b$, is mounted in a corresponding seat in the end of the adjustable tube C, which is mounted rigidly but adjustably in a stationary support, D. The tubular bearing C is threaded externally and inserted closely through a hole in the support D, and provided on its two ends with nuts E and F, bearing against opposite sides of the support, this construction permitting the tube to be adjusted endwise and fixed solidly in the required position.

The spindle is secured against forward motion, so as to retain its conical bearings in their seats, by means of a collar or coupling, G, constructed in two parts, as represented in Fig. 3. The rear end of this coupling encircles and is threaded upon the tube C, while its forward end is provided with an internal flange or collar seated in the groove $c$ of the spindle, this construction permitting the spindle to revolve freely within the coupling while being held against end motion thereby. The two parts of the coupling are united by screws or bolts, whereby they may be contracted tightly upon the tube C, so as to prevent accidental rotation. By loosening the screws and turning the coupling it may be moved forward or backward with respect to the tube, and thus the conical end $b$ seated with more or less closeness to its seat in the tube.

Centrally through the tube I insert a screw-rod, H, the forward end of which, preferably of conical form, is seated in or against the end of the spindle A, for the purpose of holding the same forward and preventing it from binding within the tube.

Owing to the manner in which the parts are connected, and to the fact that the bearing $a$ is enlarged in a forward direction, it follows that, in the event of said bearing binding or running with undue friction, so as to cause a heating of the parts, the consequent elongation of the spindle will cause the bearing to be pushed from its seat, so as to run with freedom. In short, it will be seen that in my device the heating of the parts is rendered directly instrumental in loosening the bearings. I find that when properly proportioned and adjusted the parts will respond to the slightest increase in temperature in such manner that it is impossible for the wearing-surfaces to run with objectionable or dangerous friction.

The essence of the invention consists in combining with the spindle having its bearings tapered in a forward direction means for holding it endwise to its seat.

While I prefer to retain the precise details of construction represented in the drawings, it is manifest that the adjusting devices at the rear end may be modified.

Having thus described my invention, what I claim is—

1. The shaft or spindle having the two journals tapered in the same direction and seated in suitable supports, in combination with the device, substantially as described, engaging the shaft at the end toward which the bearings taper, whereby the elongation of the shaft is caused to loosen its forward journal.

2. In combination with suitable supports, B D, the spindle provided with the tapered bearing-surfaces $ab$, the support or bearing C, adjustable endwise, and the coupling G, by which the spindle is secured against end motion, and thus held to its place in the bearings.

3. The spindle provided with the conical bearing-surfaces $a\,b$, as described, in combination with the threaded tube C, its nuts, the central adjusting-rod H, and the coupling G.

4. In combination with suitable supports, B D, the spindle provided with tapered bearing-surfaces $a$ and $b$, a longitudinally-adjustable support or bearing, C, and the coupling G, adapted to engage the circumferential groove in the spindle, and adjustable endwise independently of the bearing $b$.

5. The spindle having the tapering bearing $b$ and the groove $c$, in combination with the bearing C and the coupling G, adjustable longitudinally on support C and adapted to engage the groove of the spindle, as described.

In testimony whereof I hereunto set my hand, this 14th day of April, 1885, in the presence of two attesting witnesses.

OTTMAR MERGENTHALER.

Witnesses:
 MURRAY HANSON,
 WILLIAM F. BERRY.